May 31, 1960   J. S. STRUTYNSKI   2,938,445
CAMERA ATTACHMENT
Filed July 27, 1956
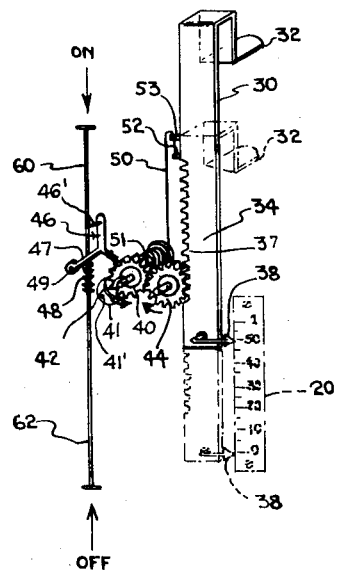
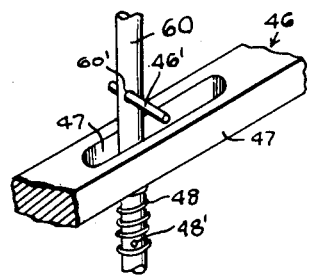
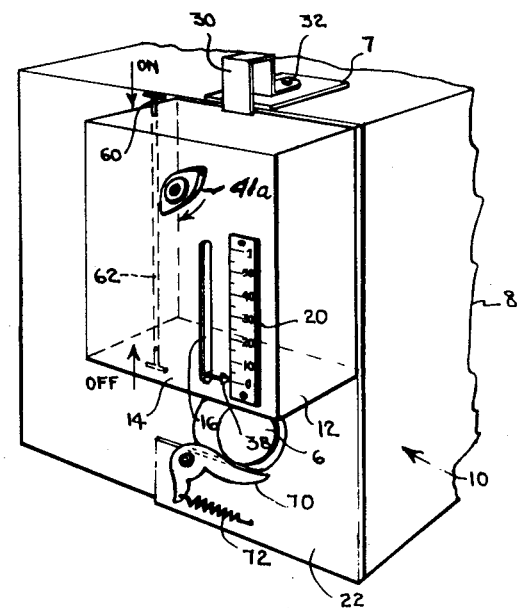
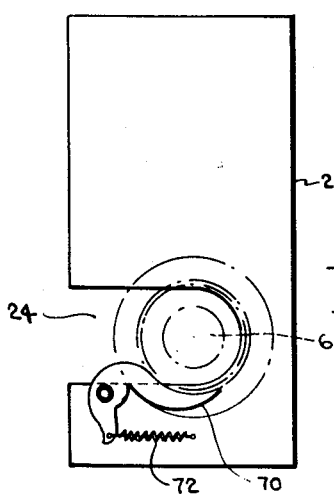
INVENTOR.
JOZEF S. STRUTYNSKI
BY
John L. Woodward
ATTORNEY

United States Patent Office 2,938,445
Patented May 31, 1960

2,938,445

CAMERA ATTACHMENT

Jozef S. Strutynski, Minneapolis, Minn., assignor to B.M.S. Automatic Co., Inc., a corporation of Minnesota Filed July 27, 1956, Ser. No. 600,428

4 Claims. (Cl. 95—53.6)

This invention relates to a camera attachment designed to automatically control the shutter at a predetermined interval, thereby permitting the operator to take a position in advance of the camera and be included in the picture.

The attachment comprises a casing which houses the operating mechanism. The operating mechanism comprises gear means for cocking or moving an actuating bar to operative position. A spring controlled pawl locks the gear means thus holding the actuating bar in its operative position until the pawl is released from engagement with the gear means, then a biased spring means moves the actuating bar to its inoperative position through means of the gear means. The casing is provided with a slot and a graduated dial is located adjacent the slot in the casing. A pointer on the actuating bar cooperates with the graduated dial on the casing.

It is an object of this invention to provide a timing device arranged in a casing which can be easily attached to a camera for automatically actuating the shutter.

It is another object of this invention to provide in a camera attachment comprising operating mechanism arranged in a casing, including an actuating means operated by gear means for moving the actuating means for the shutter to operative position and spring means which is tensioned by the gear means when the actuating means is moved to operative position for moving the actuating means to inoperative position, and locking means cooperating with the gear means for holding the actuating means in operative position and means for releasing the locking means for the gear means.

It is a still further object of this invention to provide in a camera attachment simple and efficient means for automatically actuating the shutter of a camera.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which;

Figure 1 is perspective view of the operating mechanism of the camera attachment.

Figure 2 is a perspective view of the camera attachment in operative relationship with the side of a box camera.

Figure 3 is an elevational view of the rear panel of the casing for the camera attachment disclosing the attachment secured to the knob or crank of the film winding device.

Figure 4 is a partial perspective of enlarged detail of Figure 1 showing connecting linkage of control for the operating mechanism herein described.

Referring in detail to the drawings, 10 is the camera attachment which is housed in a casing 12. The front side 14 of the casing 12 is provided with a vertical slot 16. A graduated dial 20 is secured to the front 14 adjacent the slot 16. The dial 20 is provided with the markings of from zero seconds, five seconds, ten seconds, etc. and one minute. The rear 22 of the casing 12 is provided with an open end slot 24 for a purpose to be set forth hereinafter. The top and bottom of the casing 12 are each provided with a flange and these flanges (not shown) are secured to the rear plate 22 by screws (not shown).

The operating mechanism of the timing device, comprises an elongated, vertically extending bar 30 having an offset finger 32 at its upper end. The intermediate portion of the bar is formed into a rack 34 having teeth 37 on one edge. A pointer 38 is formed on the lower end of the bar 30 and extends through the slot 16 in the front 14 of the casing 12 for cooperating with the graduated dial 20.

A gear 40 is mounted on a shaft 42 and gear 40 tion of the bar is formed into a rack 34 having teeth 37 37 on rack 34 of bar 30. A pawl 46 cooperates with gear 40 which permits movement in one direction for the gear 40 but prevents movement of gear 40 in the opposition direction when the pawl is in engagement with the gear 40. A suitable spring 48 is associated with the pawl 46. The gear 40 is engaged by a pallet 41 oscillatably mounted on the pin 41 prime. The pallet 41 is of a conventional character similar to that shown in Hodges' Patent 2,503,736 and as conventionally known in the early watch making art and originally known as the Simens and Halske system or structure.

A coiled spring 50 is wound on a spool 51 with one end anchored to the spool and with its opposite end 52 fastens to the arm 53 on bar 30. An intermediate portion of the spring 50 extends over a roller 53 on the bar 30. The spool 51 is attached to the gear 40.

A rod 60 connected to pawl 46 extends through an aperture in the top of the casing 12 and rod end 62 connected to the pawl 46 extends through an aperture in the bottom of the casing 12. The rod 60 is adapted to operate the pawl 46 through connecting linkage 46'. The connecting linkage 46' is pivotally connected to pawl 46 at one end (not shown in detail) and its opposite end is pivotally mounted in aperture 60' in rod 60. The rod 60 slidably extends through slot 47' of arm 47 on pawl 46, as shown in Figure 4 taken in conjunction with Figure 1, and the linkage 46' in conjunction with spring 48 serves to move pawl 46 for control of gear 40, as described. As the rod 60 is pushed up or down to engage pawl 46 with gear 40, the pawl 46 pivots at pivot point 49 (not shown in detail). The one end of spring 48 is secured in aperture 48' of rod 60.

The camera attachment 10 is designed to permit the photographer of a box camera 8 to set or cock the timing device 10 to operate for some designated time interval so that he may get into the picture, himself.

The box camera 8 is set on a support means such as a table, etc. The attachment 10 is secured to the winding knob 6 for the film spool on the side of the camera 8 by means of the open ended slot 24 in rear plate 22 of the casing 12. A pivotal catch 70 which is controlled by a spring 72 is positioned adjacent the slot 24 in the rear panel 22 of the casing 12. If the size of the knob 6 is smaller than slot 24, then the pivotal catch 70 will engage or grip the knob 6 thus assuring the attachment 10 will be securely mounted on the camera.

The bar 30 is moved to operative position, see solid lines in Figure 1, by rotating winding knob 41a on shaft 42 in a clockwise direction, thus moving the gear 40 in a clockwise direction and rotating pinion 44 in a counterclockwise direction engaging pinion 44 with the teeth 37 of rack 34 which elevates or raises bar 30 to the solid line position of Figure 1. When the gear 40 is moved clockwise, spool 51 moves with gear 40 and winds the coiled spring 50 thereon thus tensioning spring 50. As long as pawl 46 is engaged with the gear 40, the bar 30 will be held in its upward or operative position.

If the photographer wishes to allow a fifty second time interval for himself to get into the picture to be taken, then bar 30 is moved upwardly by means of the gear 40, pinion 44 and rack 34 until the pointer 38 registers with the graduation for fifty seconds, on dial 20, see Figure 1. The timer 10 can be set to automatically operate the shutter of the camera from five seconds to one minute time intervals.

After the actuating bar 30 has been set for fifty seconds before the shutter of the camera is to be operated, the photographer pushes rod 62 upwardly moving the pawl 46 out of engagement with gear 40. The photographer then will get into the range of the camera so that his picture is taken. The coiled spring 50 wound on spool 51 being under tension will start to unwind thus turning the gear 40 in a counter-clockwise direction and gear 40 rotates pinion 44 in a clockwise direction which in turn lowers the actuating bar 30 thus moving the pointer 38 from the fifty second graduation to the zero graduation on dial 20, then finger 32 on the actuating member 30 engages the thumb lever 7 of the box camera 8 which operates the shutter for a snap shot.

The tension on the coiled spring 50 is coordinated with gear retard mechanism which includes the gear 40, pinion 44 and rack 34 so that there is sufficient force to automatically actuate the shutter of a camera. The coordination between the spring motor and the gear retard mechanism is such that the actuating bar 30 will operate or travel at the same rate of speed throughout its movement from its operative to its inoperative position.

In Figure 1, the dotted line position shows the inoperative position of the actuating member 30.

Rod 60 upon being pushed down moves the pawl 46 into engagement with gear 40.

It is believed that from the above disclosure it will be obvious to one skilled in the art that I have provided a shutter actuator of the self-timer type which is simple and compact in construction, yet very efficient in operation.

Although I have shown and described certain specific embodiments of my invention, I am aware that many modifications thereof are possible. My invention therefore is not to be limited to the precise details of construction shown and described, but is intended to cover all modifications coming within the scope of the appended claims.

Having thus described my invention, what I claim is new and desire to secure by Letters Patent of the United States is:

1. A timing switch operating mechanism for direct attachment to a camera case and having a lever means for actuating the shutter control therefor, said switch mechanism comprising in combination a casing, a movable bar extending at one end from said casing, and having a row of teeth along at least one edge thereof, an offset finger means connected to the extending end of said bar means for pressing down on said lever means, a plurality of pinion gear means mounted in said casing and cooperative with said teeth for controlling the extended movement of said bar, a plurality of shaft means for supporting said gear means, a spool mounted on one of said shaft means, a spring member attached at one end to said bar and cooperatively associated with said spool to place tension on said bar, winding means attached to one of said shaft means for rotating said gear means to selectively move said bar and position said offset finger means in spaced relationship to said camera lens means and under pull tension of said spring member, pawl means engaging said gear means for controlling the rotation thereof against the tension of said spring means, and a rod lever means having opposite ends extending through opposite sides of said casing and operable in one position to stop said gear means from rotation under the tension of said spring means and operable in another position to release said gear means.

2. The structure of claim 1, wherein said camera has a film turning knob and said casing includes an extended side portion having a slot therein adapted to engage said knob, a pivoted catch mounted on said extended side adjacent said slot, and spring tensioning means connected to said catch.

3. A timing switch operating mechanism for direct attachment to a camera case for actuating a camera lever shutter control switch thereon comprising in combination a casing, said casing having rows of teeth along the opposite edges thereof, an offset finger mounted on said bar at the one end thereof extending from said casing, said finger being adapted to bear directly against and actuate said camera lever switch, a plurality of pinion gear means mounted in said casing and cooperable with said teeth for controlling the extended movement of said bar, a plurality of shaft means for supporting said gear means, a spool mounted on one of said shaft means, a tension spring mounted about said spool having one end attached to said bar and the opposite end attached to said spool, winding means attached to one of said shaft means externally of said casing for rotating said gear means to selectively raise said bar and position said offset finger in spaced relationship to said lever switch under the direct pull tension of said spring means attached thereto, pawl means engaging said gear means for controlling the rotation thereof in either direction, and a rod lever means having opposite ends extending through opposite side of said casing and operable in one position to stop said gear means from rotation under the tension of said spring means and operable in another position to release said gear means.

4. A timing switch operating mechanism for direct attachment to a camera case for actuating a camera lever shutter control switch comprising in combination a casing, a movable bar extending at one end from the upper side of said casing, said bar having a row of teeth along at least one edge thereof, an offset finger mounted on the one end of said bar and adapted to bear in direct engagement against said lever switch, a plurality of pinion gear means mounted in said casing and one of said gear means having teeth engaged in said teeth on said bar, a plurality of shaft means for supporting said gear means, a spool mounted on one of said shaft means, spring means associated with said spool and said bar and one end of said spring means being attached to said bar, winding means attached to one of said shaft means and indirectly associated with the pinion gear having teeth associated with the teeth on said bar for turning said pinion gear to selectively raise said bar and position said offset finger in spaced relationship to said lever switch against the tension of the said spring attached to said bar, pawl means engaging said gear means for controlling the rotation thereof in either direction, and a rod lever means having opposite ends extending from said casing and operable in one position to stop said gear means from rotation under the tension of said spring means and operable in another position to release said gear means.

References Cited in the file of this patent

UNITED STATES PATENTS

| | | |
|---|---|---|
| 1,250,628 | Nishiyama | Dec. 18, 1917 |
| 2,503,736 | Hodges | Apr. 11, 1950 |
| 2,626,660 | Seeler et al. | Jan. 27, 1953 |
| 2,742,836 | Louie | Apr. 24, 1956 |